United States Patent [19]
Mather et al.

[11] Patent Number: 5,944,378
[45] Date of Patent: Aug. 31, 1999

[54] TWO-PART CONVERTIBLE TOP FOR A MOTOR VEHICLE

[75] Inventors: Carl Mather, Lake Orion; Douglas J. Quigley, Rochester Hills; Stephen J. Sowinski, Rochester Hills; Tim W. Anness, Rochester Hills; Glen M. Kondratek, Sterling Heights, all of Mich.

[73] Assignee: Chrysler Corporation, Auburn Hills, Mich.

[21] Appl. No.: 09/121,565

[22] Filed: Jul. 23, 1998

[51] Int. Cl.⁶ ........................................... B60J 7/06
[52] U.S. Cl. ............... 296/219; 296/146.14; 296/107.19; 296/107.08
[58] Field of Search .................. 296/107.07, 107.08, 296/107.19, 136, 146.14, 146.16, 219, 220.01

[56] References Cited

U.S. PATENT DOCUMENTS

| | | | |
|---|---|---|---|
| 2,694,598 | 11/1954 | Ulrich | 296/219 |
| 4,971,385 | 11/1990 | Lazarevich et al. | 296/136 |
| 5,271,655 | 12/1993 | Ball et al. | 296/107.07 |
| 5,509,712 | 4/1996 | Rausch et al. | 296/124 |
| 5,709,426 | 1/1998 | DeRees et al. | 296/185 |
| 5,823,606 | 10/1998 | Schenk et al. | 296/107.08 |

FOREIGN PATENT DOCUMENTS

| | | | |
|---|---|---|---|
| 677045 | 3/1930 | France | 296/219 |
| 1622326 | 7/1988 | Japan | 296/219 |
| 273894 | 7/1927 | United Kingdom | 296/107.19 |
| 637871 | 5/1950 | United Kingdom | 296/219 |
| 2256621 | 12/1992 | United Kingdom | 296/219 |

*Primary Examiner*—Dennis H. Pedder
*Attorney, Agent, or Firm*—Mark P. Calcaterra

[57] ABSTRACT

A convertible top for a motor vehicle. The top is supported by rails for movement between a deployed position and a stored position in the trunk of the vehicle. A deck lid closes the trunk and can be retracted to a position clearing a path for movement of the top between deployed and stored positions. The top is made of two separate parts, a roof part and a rear part.

8 Claims, 7 Drawing Sheets

TWO-PART CONVERTIBLE TOP FOR A MOTOR VEHICLE

This invention relates generally to convertible tops for motor vehicles and more particularly to a two-part convertible top which can be readily deployed for use or retracted to a stored position.

BACKGROUND OF THE INVENTION

Convertible motor vehicles, commonly referred to as "convertibles," have tops which typically consist of a flexible cover and a supporting frame. To put the top down, the frame is retracted, often with considerable difficulty, to a position at the rear of the vehicle where it is not completely out of sight, thus detracting from the esthetic appearance of the vehicle as well as at least partially obstructing the driver's vision. The flexible covers of these tops are of one piece construction and are either completely deployed or completely retracted and stored. What is needed is a top for a convertible which is easy to deploy and retract and which may be stored completely out of sight when not in use, and also which is made in two parts so that one or both of the parts may be retracted and stored depending on the wishes of the operator.

SUMMARY OF THE INVENTION

In accordance with present invention, a convertible top for a motor vehicle is provided in which a support for the top includes laterally spaced rails, with the top having runners or rollers engaging the rails for movement along the rails between a deployed position of use and a retracted, stored position. Preferably, the top is stored in the trunk of the vehicle.

Further in accordance with the invention, a deck lid for the trunk is pivoted on a frame. The frame is pivoted to rigid vehicle support structure to enable it to be moved to a position in which the deck lid clears a path for movement of the convertible top between the deployed and stored positions.

Preferably the convertible top is made of two separable parts, a roof part and a rear part. Both parts are preferably flexible so that they may slide along the rails without obstruction or interference. The roof part may be made of flexible foldable transverse panels.

One object of this invention is to provide a convertible top for a motor vehicle having the foregoing features and capabilities.

Another object is to provide a convertible top for a motor vehicle which is composed of a relatively few simple parts, is easy to deploy and retract and when retracted is stored completely out of sight, and which can be easily manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
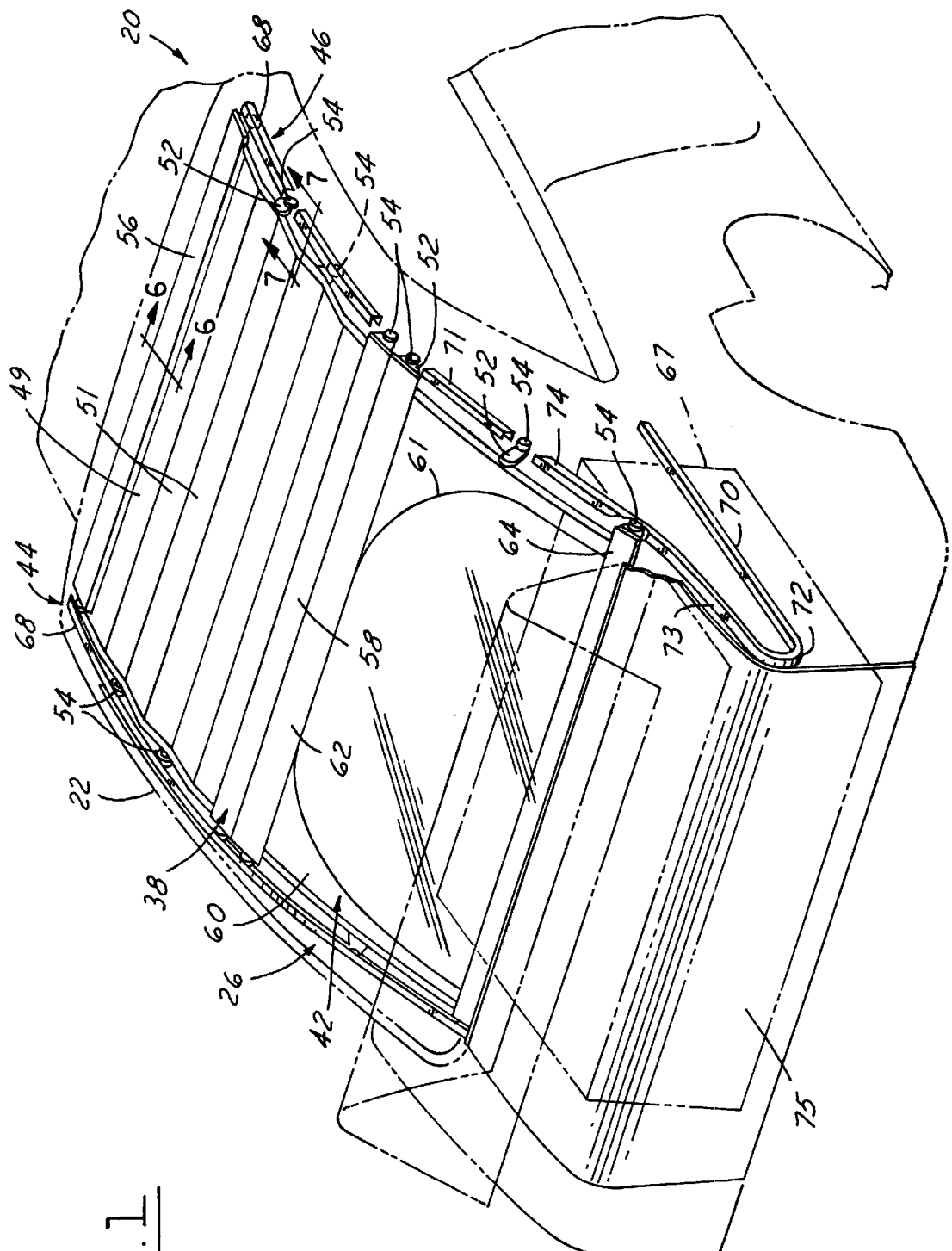
FIG. 1 is a fragmentary perspective view of a portion of a motor vehicle having a convertible top constructed according to the invention. The outline of the motor vehicle is shown in broken lines with portions of the vehicle deleted to more clearly illustrate the convertible top which is shown in the closed, or fully deployed, position. The deck lid is shown closed in solid lines and open in broken lines.

Referring now more particularly to the drawings, there is shown a motor vehicle 20 having an upper body roof portion 22 formed with an opening 24 which is adapted to be closed by a convertible top system 26 constructed in accordance with this invention. The motor vehicle 20 is shown in broken lines. The opening 24 is shown in broken lines and is shown only in FIG. 4, for clarity of illustration of the convertible top system in FIGS. 1–3, 4 and 5. The opening 24 has the laterally spaced apart side edges 30 and 32, the front edge 34 and the rear edge 36.

The convertible top system 26 includes a convertible top 38 having a front or roof part 40 and a rear part 42. The system 26 also includes laterally spaced rails 44 and 46 on opposite sides of the top 38. The rails are secured to the vehicle body in laterally spaced vertical planes and are in the form of inwardly facing channels.

Figure 8:
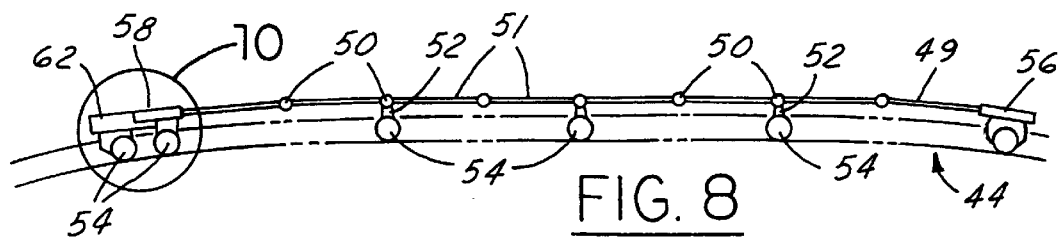
FIG. 8 is a semi-diagrammatic fragmentary view showing the rollers on the roof part of the convertible top engaging one of the rails.
Figure 9:
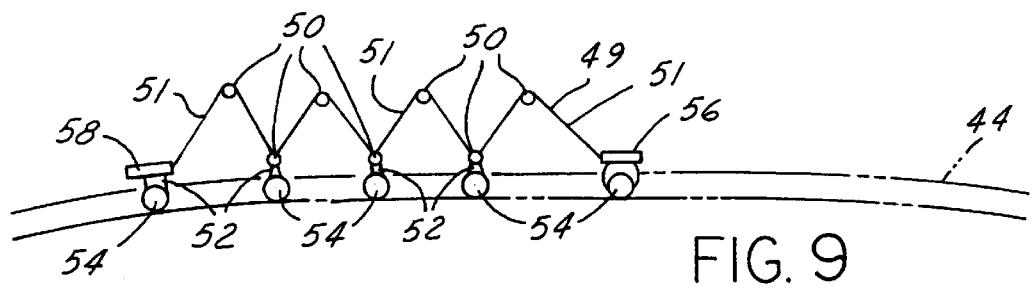
FIG. 9 is a view similar to FIG. 8, but shows the roof part in a partially opened position and the roof part panels partially folded.

The roof part 40 preferably includes a continuous substantially rectangular cover sheet 49 of a suitable plastic or fabric material, is flexible and waterproof, and has longitudinally spaced, parallel transverse rods 50 secured thereto to divide the sheet into a plurality of foldable transverse sections 51. Brackets 52 at opposite ends of alternate rods have runners in the form of rollers 54 engaged in the channels of the rails 44 and 46. The front edge of the cover sheet 49 is secured to a front transverse bar 56 also having brackets 52 at opposite ends with rollers 54 carried thereby engaged in the channels of rails 44 and 46. A similar transverse bar 58 is secured to the rear edge of the cover sheet 49 and likewise has brackets 52 at opposite ends provided with rollers 54 engaged in the channels. The rollers 54 can slide or roll in the channels 44, 46 to either extend or fold the sheet 49 of the roof part. The roof part is shown extended in FIGS. 1 and 8 and partially folded in FIG. 9. The roof part is shown fully folded in FIGS. 2 and 3.

The rear part 42 of the convertible top 38 preferably includes a substantially rectangular, flexible waterproof cover sheet 60. The cover sheet 60 may be made of any suitable material such as plastic and the center portion 61 is preferably a clear plastic material. A transverse bar 62 is secured to the front edge of the cover sheet 60 and a similar transverse bar 64 is secured to the rear edge thereof. The two bars 62 and 64 have brackets 52 at opposite ends with rollers 54 carried by the brackets and engaged in the channels 44 and 46. Each side edge of the cover sheet 60 may also have one or more brackets 52 mounting rollers 54 engaged in the rails 44, 46.

The vehicle has a rear storage compartment 67 which is preferably the usual trunk commonly provided on many motor vehicles. The trunk is shown in broken lines diagrammatically as a simple rectangular box-like space.

The rails 44 and 46 are mirror images of one another. Each rail has an upper generally horizontal forward portion 68 in the upper body roof portion 22 of the vehicle, a lower, generally horizontal rear portion 70 extending across the trunk space preferably about midway between the upper and lower limits of the trunk space, and a connecting portion 71. As shown, the connecting portion 71 has a forwardly facing generally U-shaped section 72 at the rear end of the rear portion 70 and then extends forwardly with a section 73 generally parallel to the rear portion 70 and an upwardly curving section 74 merging into the forward portion 68. The portions 68 and the sections 73 and 74 of the portions 71 of the rails follow the general contour of the upper body roof portion 22 of the vehicle body along the opposite side edges 30 and 32 of the opening 24.

FIG. 1 shows the convertible top 38 fully deployed, closing the opening 24 in the upper body roof portion 22 of the vehicle. The roof part 40 of the convertible top 38 extends rearwardly from the front edge 34 of the opening 24 to about where the connecting portions 71 of the rails begin. The rear part 42 extends rearwardly from the front part to about where the connecting portions end.

Figure 2:
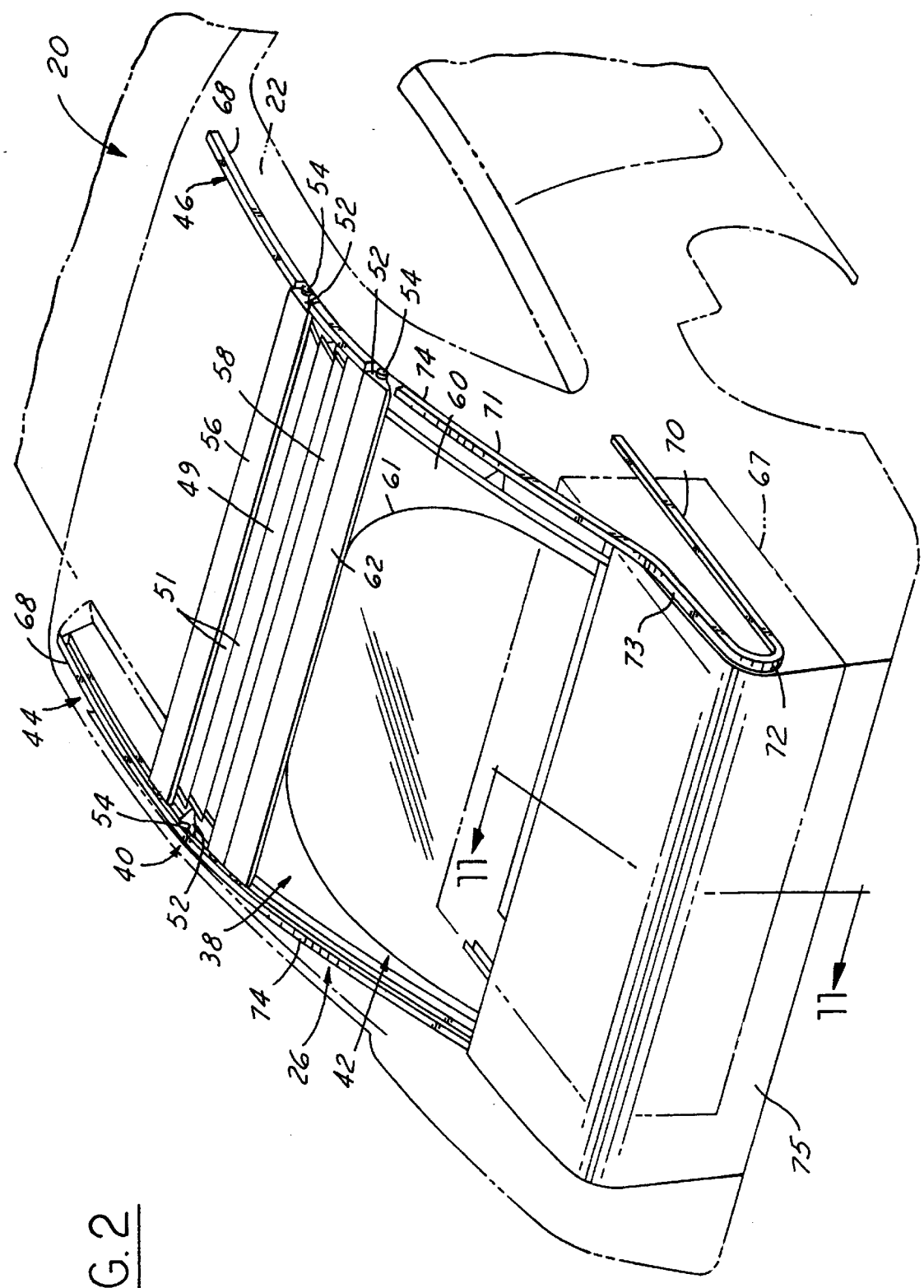
FIG. 2 is a perspective view similar to FIG. 1, but shows the roof part of the convertible top partially opened.

FIG. 2 is similar to FIG. 1 but shows the roof part 40 of the top open, that is with its front transverse bar 56 slid rearwardly close to the rear transverse bar 58 thereof and the sections 51 of the cover sheet 49 folded. The rear part 42 of the convertible top 38 remains in its deployed position.

The trunk 67 is closed by a deck lid 75. The front edge of the deck lid is supported for pivotal movement about a transverse horizontal axis by hinges 76 (FIGS. 5, 11 and 12), the hinges being carried by a frame 78. The frame 78 has a rear horizontal transverse bar 80 (FIG. 5) the opposite ends of which are pivoted to rigid vehicle support structure by aligned horizontal transverse pivot pins 82. Extending upwardly from the ends of the transverse bar 80 of the frame are two parallel legs which terminate in horizontal parallel, forwardly extending portions 84. The hinges 76 for the deck lid 75 are carried by the front ends of the forwardly extending portions 84 of these legs. The pivot axis provided by hinges 76 is parallel to the axis of pivot pins 82.

Figure 11:
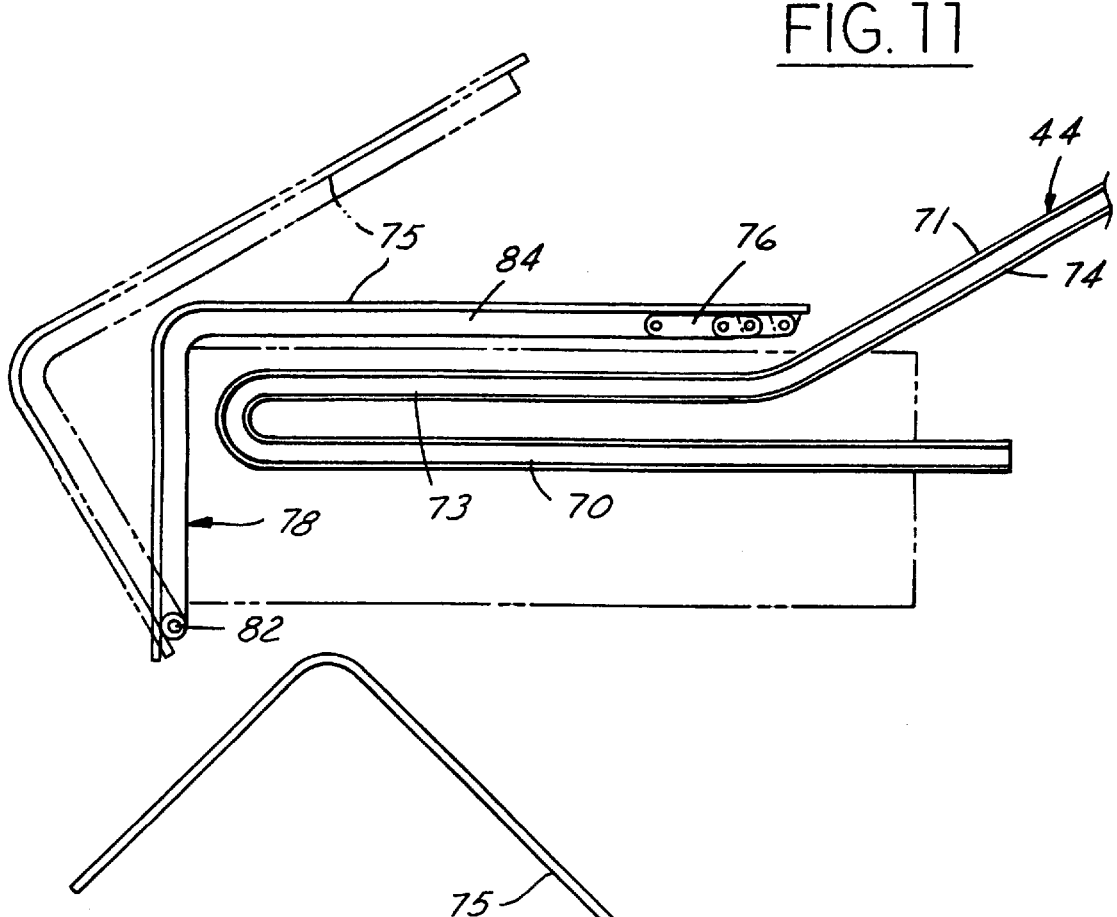
FIG. 11 is a fragmentary view taken on the line 11—11 in FIG. 2 and showing the frame which supports the deck lid in its normal position with the deck lid closed. The frame and deck lid are shown in a retracted position in broken lines.
Figure 12:
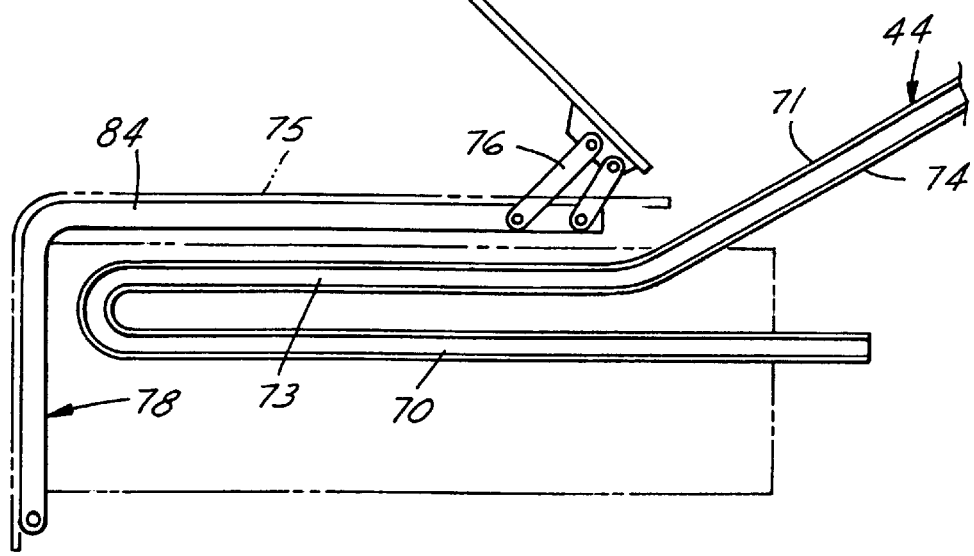
FIG. 12 is a view similar to FIG. 11 showing the frame for the deck lid in its normal position with the deck lid open. The deck lid is also illustrated in broken lines in its closed position.

FIG. 11 shows the deck lid 75 in the down or closed position. FIG. 12 shows the deck lid in the raised or open position. FIG. 11 shows in broken lines the frame 78 pivoted rearwardly about the pivot pins 82 to a retracted position in which the frame and the deck lid 75 clear a path enabling movement of both parts 40 and 42 of the convertible top to a stored position in the trunk space 67.

Figure 6:
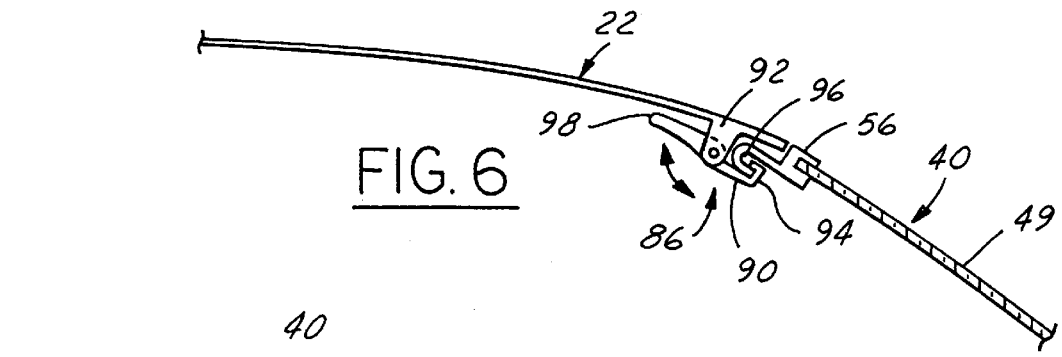
FIG. 6 is a sectional view taken on the line 6—6 in FIG. 1.
Figure 7:
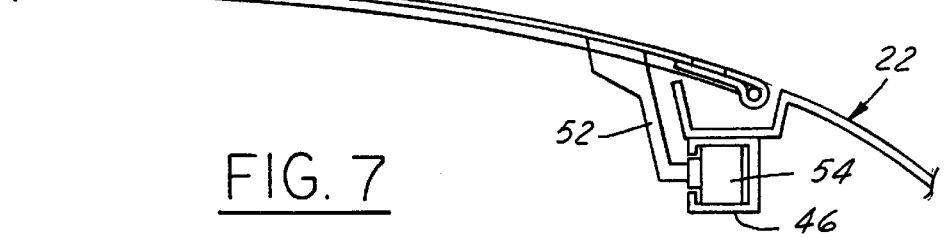
FIG. 7 is a sectional view taken on the line 7—7 in FIG. 1.

In the FIG. 1 position of the convertible top 38, the front bar 56 of the roof part 40 is latched to the roof of the vehicle body by a latch 86 (see FIG. 6). The latch 86 has an arm 90 pivoted to a bracket 92 on the upper body roof portion 22 of the vehicle adjacent the front edge 34 of the opening 24. The arm 90 has a hook 94 and can be swung to the position shown in FIG. 6 in which the hook catches a groove 96 on the bar 56. The arm 90 can also be pivoted in the opposite direction to withdraw the hook 94 from the groove 96 and release the bar 56. The arm 90 has a handle portion 98 for swinging it between latched and released positions.

Figure 10:
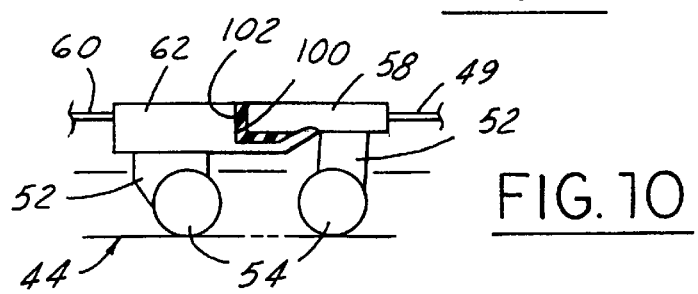
FIG. 10 is an enlarged view of the structure shown within the circle 10 in FIG. 8.

In the position of FIG. 1, the transverse bar 58 at the rear of the roof part 40 abuts against the transverse bar 62 at the front of the rear part 42. As shown in FIG. 10, the transverse bar 62 has a recess 100 in which there is a sealing strip 102 adapted to engage the rear transverse bar 58 of the roof part 40.

In FIG. 2 the front bar 56 of the roof part has been released by latch 86 and slid rearwardly adjacent to the rear bar 58 thereof, with the intermediate panels 51 shown in a folded condition.

Figure 3:
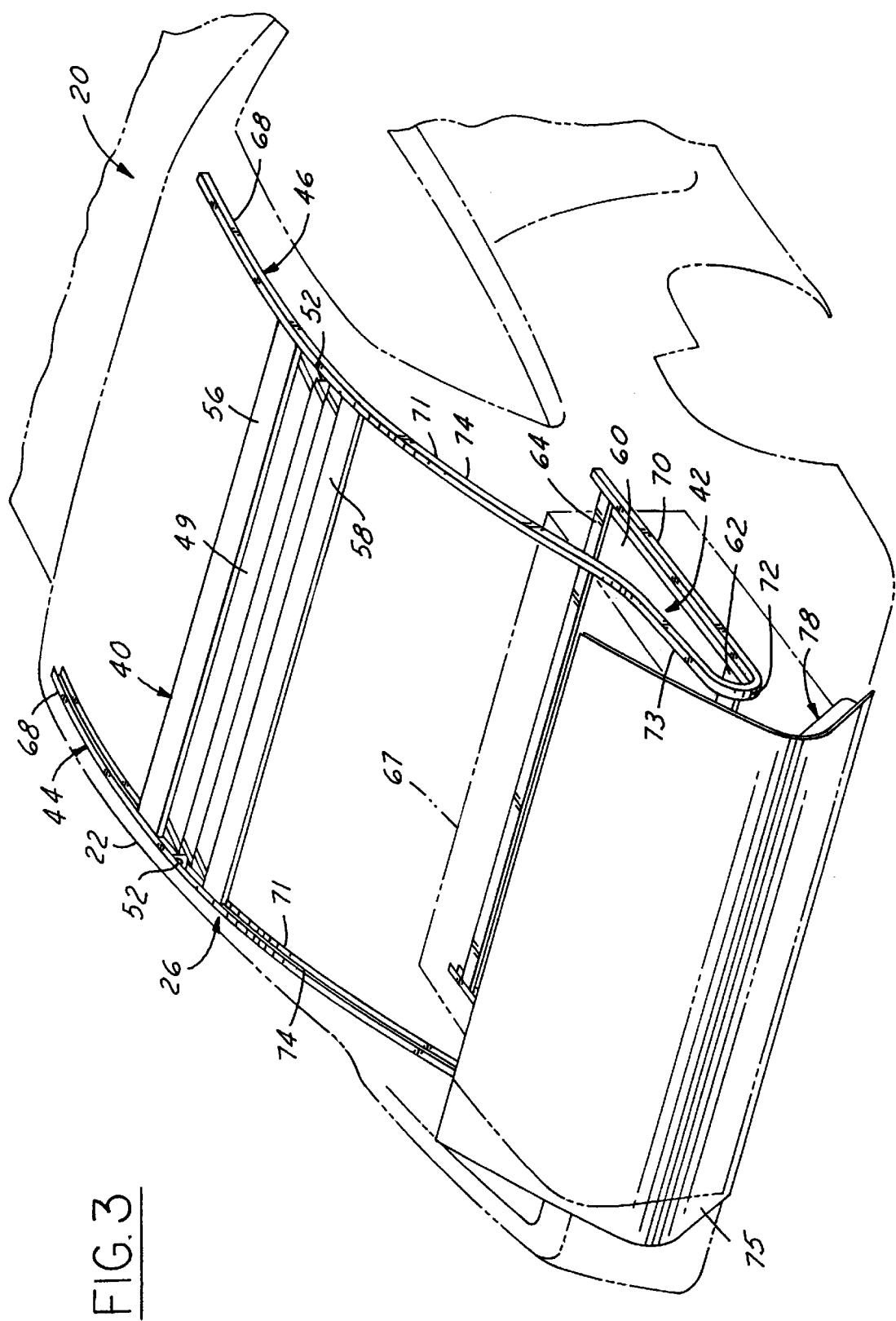
FIG. 3 is a view similar to FIGS. 1 and 2, but shows the roof part partially retracted and the rear part fully retracted to the stored position. The deck lid is opened to clear a path permitting movement of the convertible top between the deployed and stored positions.

FIG. 3 is similar to FIG. 2 except that the rear part 42 of the top 38 has been moved to a stored position in the trunk space. This has been accomplished by sliding the rollers 54 of the rear part along the rails around the U-shaped section 72 of the rails to a fully stored position in which the entire rear part 42 is supported on the rear portion 70 of the rails. This view shows the deck lid 75 and frame 78 retracted rearwardly to clear a path for movement of the rear part 42 of the top 38 between the deployed and stored positions.

Figure 4:
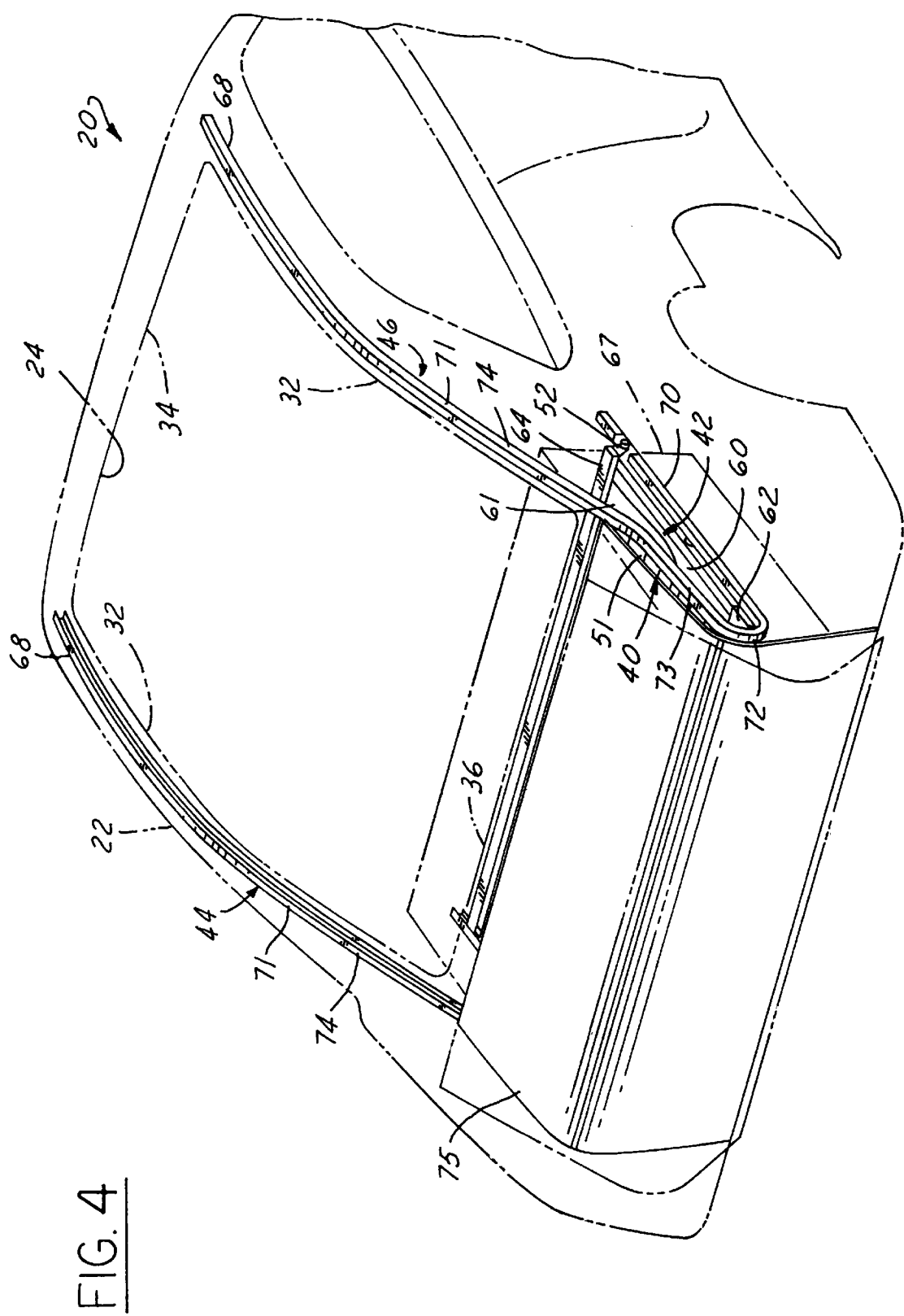
FIG. 4 is a perspective view similar to FIGS. 1–3, but shows both parts of the convertible top in the stored position.

FIG. 4 differs from FIG. 3 in that the front roof part 40 has also been moved to a stored position in the trunk space and in this stored position extends along the generally horizontal section 73 of the connecting portion 71 of the rails. The deck lid 75 and frame 78 would be retracted to the broken line position to clear the path for movement of the roof part 40 to a stored position.

Figure 5:
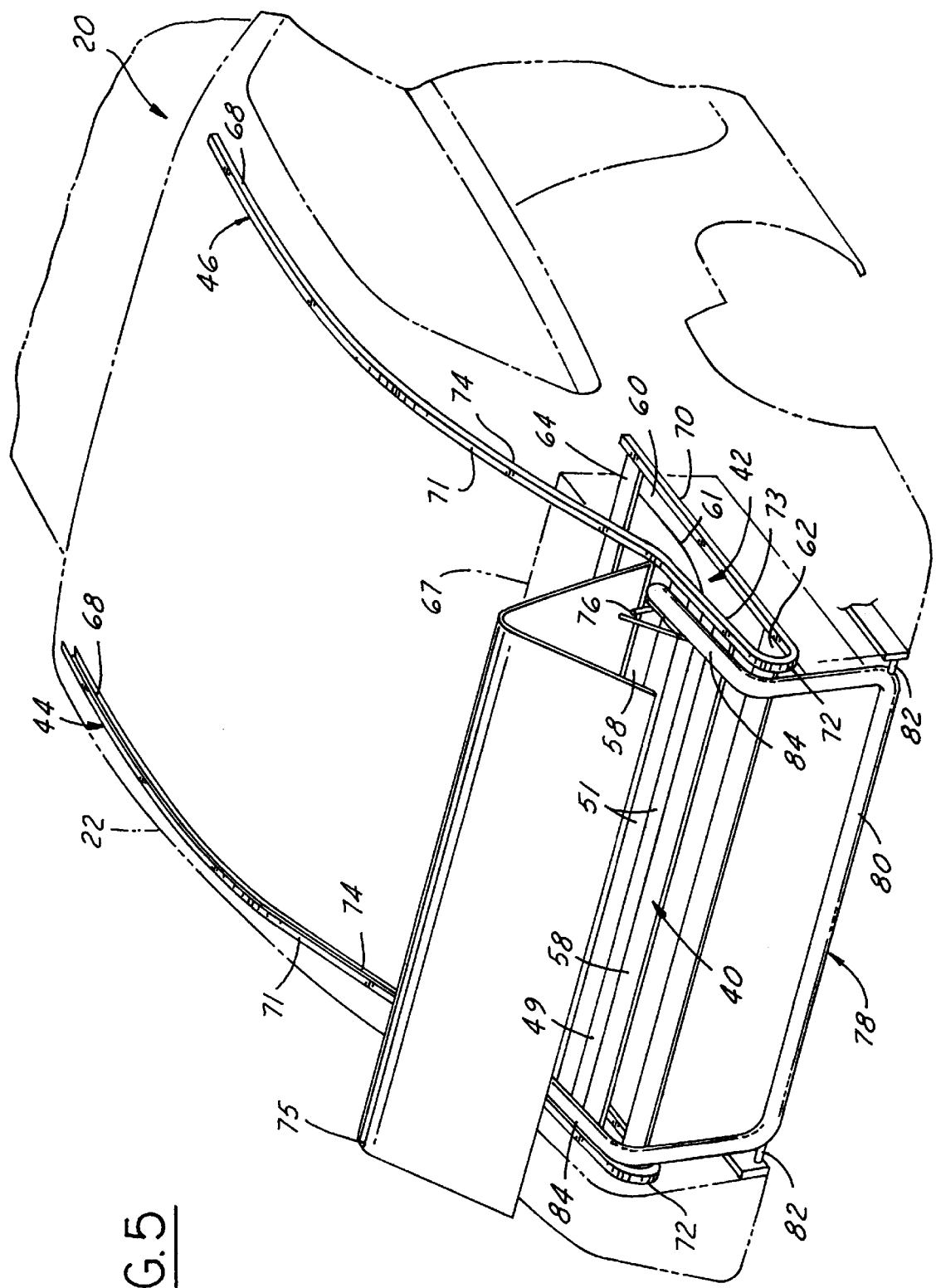
FIG. 5 is a view similar to FIG. 4 but shows the deck lid for the trunk in the open position.

FIG. 5 shows the entire convertible top, including parts 40 and 42, in the stored position and also shows the deck lid raised to provide access to the trunk space so that luggage and the like may be stowed away in the usual manner. When the entire convertible top is stored in the trunk space, it occupies the upper portion thereof so that the available space to accommodate luggage and the like is reduced.

What is claimed is:

1. In combination, a motor vehicle having a convertible top, support means for said top, said support means comprising laterally spaced rails extending along opposite sides of said top, means carried by said top engaging said rails for movement of said top along said rails between a deployed position of use and a retracted, stored position, said rails being disposed in parallel planes and being substantially mirror images of one another, an upper portion of each of said rails extending rearwardly from a front extremity thereof, a lower portion of each of said rails extending rearwardly from a front extremity thereof, and an intermediate portion of each of said rails having a forwardly opening, U-shaped section connecting a rear extremity of the upper portion thereof to a rear extremity of the lower portion thereof, said top extending rearwardly from the front extremity of the upper portion of said rails in the deployed position thereof, and extending rearwardly from the front extremity of the lower portion of said rails in the stored position thereof.

the motor vehicle having a rear storage compartment, said top when in the stored position thereof being disposed in said rear storage compartment, the rear storage compartment comprising a trunk of the motor vehicle, a rear deck lid for said trunk, a frame, first pivot means pivotally mounting a forward edge portion of said deck lid to said frame for movement of said deck lid between open and closed positions relative to said trunk, and second pivot means pivotally mounting said frame to rigid support structure of the vehicle to enable movement of the frame to a position in which the deck lid clears a path for movement of said top between the deployed and stored positions thereof.

2. A combination as in claim 1, wherein said frame has a front portion and a rear portion, said forward edge portion of said deck lid is pivotally mounted by said first pivot means to the front portion of said frame, said frame is pivotally mounted by said second pivot means to the support structure at the rear portion of said frame, and said first and second pivot means have parallel, horizontal axes.

3. A combination as in claim 2, wherein said top has separable roof and rear parts.

4. A combination as in claim 3, wherein the roof part of said top has flexible foldable transverse sections, folding of said sections enabling at least partial opening of said roof part while in the deployed position thereof.

5. A combination as in claim 3, wherein said rear part of said top is flexible.

6. In combination, a motor vehicle having a convertible top, support means for said top, said support means comprising laterally spaced rails extending along opposite sides of said top, said top having separable roof and rear parts, means carried by said roof and rear parts engaging said rails for movement of said roof and rear parts along said rails between a deployed position of use and a retracted, stored position, said roof part having flexible, foldable transverse sections, folding of said sections enabling at least partial opening of said roof part while in the deployed position thereof, said rear part being flexible, said motor vehicle having a rear storage compartment defined in a rear trunk of the vehicle, said rails having storage portions extending into said rear storage compartment to receive and support said top when in the stored position thereof, a rear deck lid for said trunk, a frame, first pivot means pivotally mounting a forward edge portion of said deck lid to said frame for movement of said deck lid between open and closed positions relative to said trunk, and second pivot means pivotally mounting said frame to rigid support structure of the vehicle to enable movement of the frame to a position in which the deck lid clears a path for movement of said top between the deployed and stored positions thereof.

7. A combination as in claim 6, wherein said frame has a front portion and a rear portion, said forward edge portion of said deck lid is pivotally mounted by said first pivot means to the front portion of said frame, said frame is pivotally mounted by said second pivot means to the support structure at the rear portion of said frame, and said first and second pivot means have parallel, horizontal axes.

8. A combination as in claim 7, wherein the top when in stored position occupies an upper portion only of the storage compartment so that a lower portion of the storage compartment is available to accommodate luggage.

* * * * *